Sept. 1, 1936.　　C. E. COCHRAN　　2,052,697
INDUSTRIAL TRUCK
Filed Feb. 18, 1935　　2 Sheets-Sheet 1
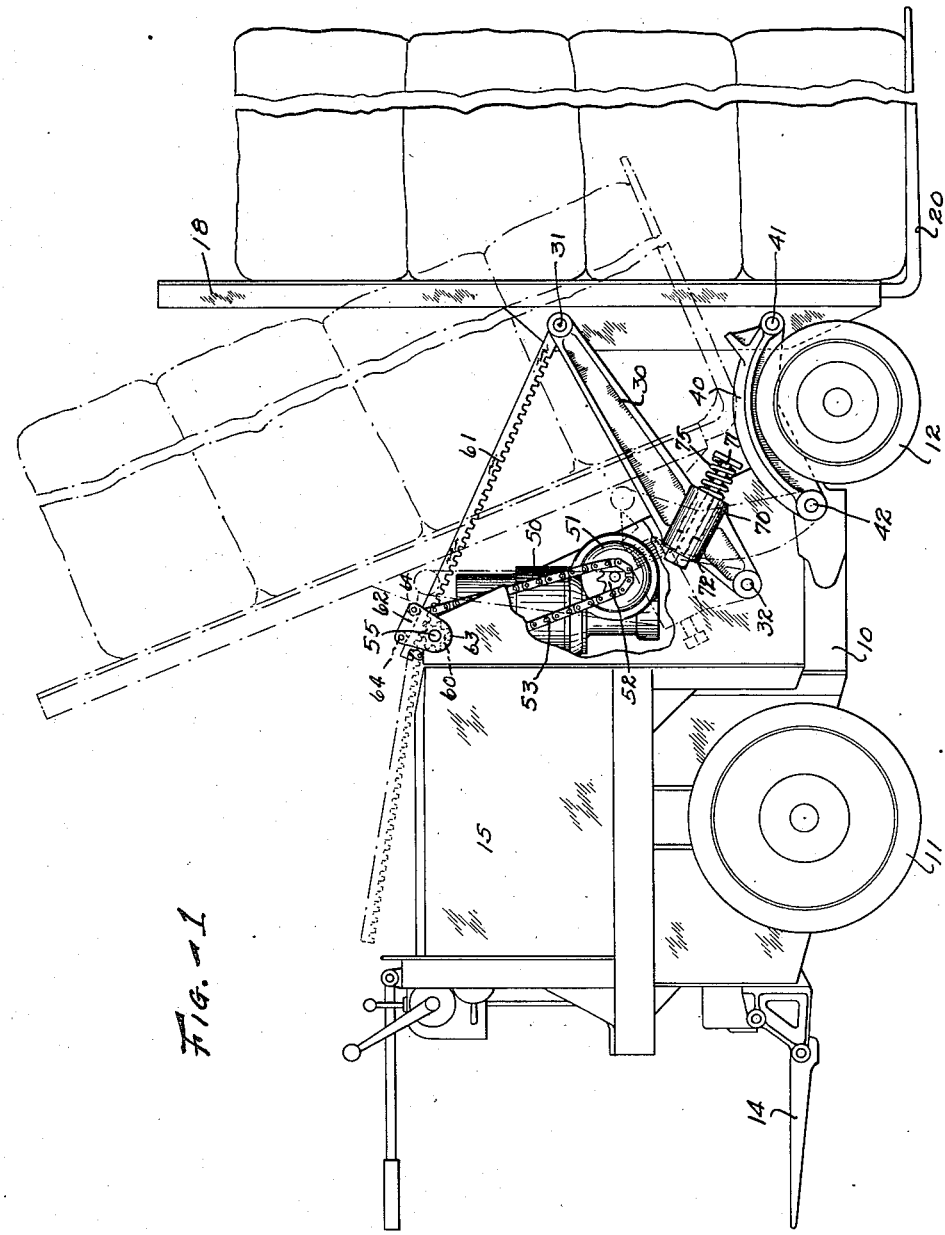
Inventor
Clyde E. Cochran
By Bates, Golrick & Teare
Attorneys

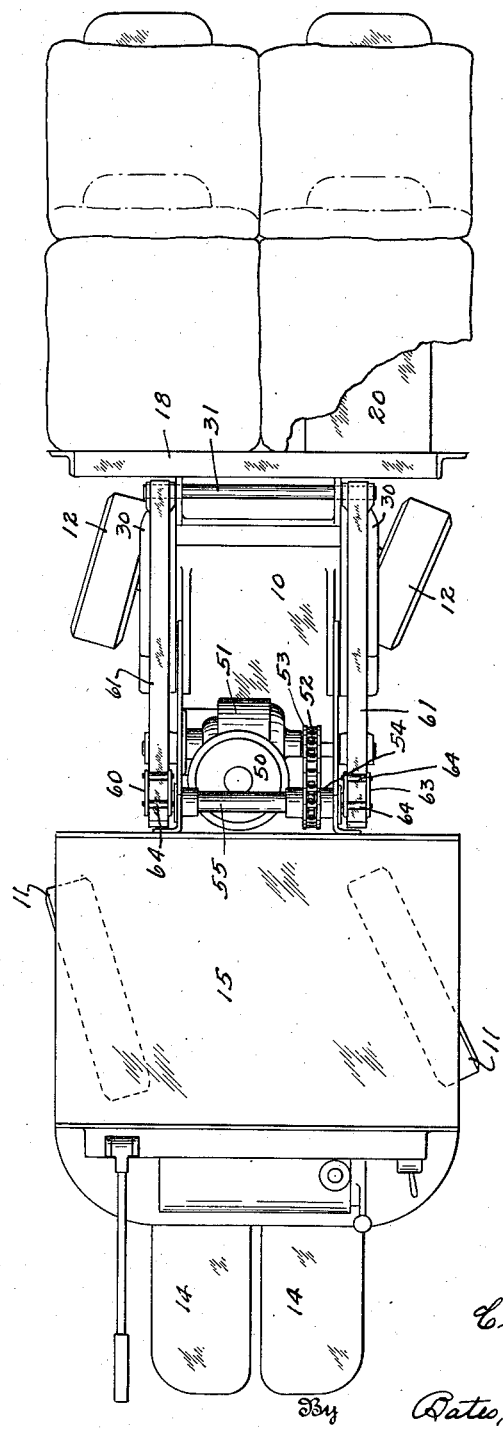

Patented Sept. 1, 1936

2,052,697

UNITED STATES PATENT OFFICE 2,052,697

INDUSTRIAL TRUCK

Clyde E. Cochran, Cleveland, Ohio, assignor to The Elwell-Parker Electric Company, Cleveland, Ohio, a corporation of Ohio Application February 18, 1935, Serial No. 6,922

7 Claims. (Cl. 254—3)

This invention relates to an industrial truck mechanism for engaging a load and transporting such load from place to place, and especially to an industrial truck having a load-engaging member adapted to be projected beneath the load and raise it for transportation by a tilting movement of the load-engaging member. This, therefore, is the general object of the present invention.

A more specific object is to provide an industrial truck, wherein the load is raised from its supporting surface by a pivoting or swinging movement of the load engaging member of the truck, such movement also acting to decrease the combined overall length of the truck and load.

A more specific object of the present invention is to provide a power-propelled industrial truck with a load engaging member disposed forwardly of the truck frame and wheels, and to pivot the load engaging member to the truck chassis, so that consequent upon the pivoting of such member the weight of the load will be distributed to the propelling wheels of the truck.

Other objects of the invention will become more apparent from the following description, reference being had to a preferred embodiment of the invention, illustrated in the accompanying drawings. The essential characteristics of the invention will be set forth in the claims.

In the drawings, Fig. 1 illustrates an industrial truck in side elevation, certain parts of the truck being broken away to more clearly illustrate the internal construction; Fig. 2 is a plan view of the truck shown in Fig. 1.

In the past, industrial trucks have been provided with wedge like load engaging members adapted to be projected beneath a load by the movement of the truck towards the load. Such members have been pivoted to the forward end of the truck and have been arranged to be tilted to raise the load from the load-supporting surface in order that the load might be transported from place to place. Generally, trucks of this type have been power-driven, the power having been applied to suitable driving wheels located adjacent the rear of the truck. Consequent upon the tilting of the load, the weight thereof, has acted to rock the truck about the front wheels, thereby raising the rear or driving wheels of the truck to such an extent that, in the case of heavy loads, insufficient traction was had to propel the truck from place to place.

To overcome the disadvantage above mentioned, the length of the truck was elongated to position the driving wheels further away from the pivot of the load-engaging member and the forward wheels, so that the motor or power unit, which was normally mounted on the driving end of the truck, might act to counter-weight the load. However, even when the truck was so lengthened, in some instances it was found essential to add to the weight of the rear portion of the truck for the sole purpose of counter-weighting the action of the load, and in no instance was it practical to lighten the power unit.

Thus, while overcoming one disadvantage, other disadvantages were created. When the length of the truck was increased, as was often done, such trucks, in present-day manufacturing, were required to make comparatively sharp turns, and the lengthening of the truck increased the floor area for making turns, thus presenting a disadvantage, which, while not as great as the lack of a counter-weight, nevertheless materially limited the operations of the truck.

Likewise, it is obvious, that adding weight to the rear portion of the truck required a heavier frame or chassis construction, thereby increasing the cost of manufacturing and operating the truck. It is therefore seen, as pointed out above, that while some disadvantages have been overcome, they have, however, created new problems and disadvantages.

In the past, industrial trucks were generally operated by electric motors which were powered by storage batteries. Such batteries, of course, were heavy and were located at the rear of the truck above the truck propelling or driving wheels. This weight often served as a part of the counterweight for the load. However, present-day practice often substitutes, for the storage battery power unit, an internal combustion motor, the weight of which is materially less than the batteries, hence the problems of counter-weighting the load has been materially increased.

Therefore, an object of the present invention is to overcome the difficulties above set out, by providing a truck of minimum weight and at a minimum cost, which will handle maximum weight loads without requiring counterweights and the like and at the same time retain the advantageous load engaging principals of past constructions. Indeed, the object is to solve anew the original problem, which, in the past, was solved by the use of counterweights and the like.

I prefer to accomplish the objects of this invention by providing a truck with a swingable load carrier arranged to normally lie at the front of the truck with its load-engaging member normally projecting forwardly of the truck frame, but so arranged that it may be swung by a pivotal support to a tilted position above the truck chassis and there retained with the weight of the load rearwardly of the axis of the forward wheels, and with a considerable portion of such weight transmitted to the truck frame substantially midway between the axis of the rear truck wheels and the axis of the forward truck wheels, whereby the center of gravity of the load itself lies to the rear of the axis of the forward wheels of the truck, thereby eliminating the weight on the rearward end of the truck for counter-weighting the load. At the same time, by moving the load upwardly and rearwardly while at the same time tilting it, I am able to decrease the overall length of the truck in that the forwardmost end of the load-engaging member will be considerably closer to the forward edge of the truck chassis than has been possible with truck constructions in the past.

Referring again to the drawings, it will be noted that I show an industrial truck having a chassis or frame 10 mounted on the usual dirigible driving wheels 11 at the rear end thereof, and relatively small load wheels 12 at the forward end. A platform 14 is provided at the rear of the truck for supporting the operator. Various controls extend rearwardly, adjacent the platform, whereby movements of the truck and the load-engaging mechanism may be readily effected.

At the rear portion of the truck, above the driving wheels 11, I provide a suitable housing 15 which may enclose an internal combustion motor or other suitable power unit, such as a storage battery and electric motor unit, either of which units is readily connected, in any of several well-known manners, to drive the wheels 11.

Carried by the chassis or frame 10 and normally disposed forward of the truck chassis 10, is an upright frame 18. This frame is carried by pivotal supports, as will be hereinafter more fully described. The upright frame comprises an L-shaped frame member having forwardly projecting tines 20, which, in the normal position of the load-engaging member, as shown in full-line Figure 1, are carried entirely forward of the chassis and are arranged to be projected beneath a load, in the manner of a wedge, consequent upon the forward travel of the truck toward the load.

The upright frame 18, as heretofore mentioned, is carried by pivotal supports which connect such member to the frame 10. As shown in the drawings, I provide a pair of links 30 and a pair of links 40, one link of each pair being disposed at either side of the truck and connected to corresponding sides of the load-engaging member. One end of the links 30 and 40 are pivoted to shafts or rods 31 and 41, respectively, which are carried by the upright member 18. The other ends of these links are pivoted as at 32 and 42 to the truck frame or chassis 10. It will be noted that the pivots 32 and 42 both lie to the rear of the load-bearing wheels 12 and at least one of these pivots, such as the pivot 32, is substantially midway between the driving wheels 11 and the load-bearing wheels 12.

The arrangement of the links 30 and 40 is such that consequent upon the swinging of the load supports about the pivots 32 and 42, the load-engaging member 18 will be tilted rearwardly and will be simultaneously swung to a position overlying the truck frame, as shown in dotted lines on Fig. 1. This is accomplished by the fact that the links are of unequal length. It will be noted that as the movement of the supporting links 30 and 40 to tilt the load not only raises the load clear of the truck supporting surface, to a point above the chassis frame 10, but also carries the load-engaging member, with the load supported thereon, rearwardly to a position where the center of gravity of the load lies rearwardly of the forward truck wheels 12, thereby decreasing the overall length of the truck. When the load-engaging member has been tilted, the weight of the load is entirely supported by the link members 30 and 40, which, as shown in dotted lines on Fig. 1, extend in a substantially vertical position, thereby providing a structure of great strength. The arrangement is such that the weight of the load acts to rock the members 30 and 40 still further rearwardly, thereby relieving the operating mechanism of strain during the transportation of the load. The position of the pivots 32 and 42 result in a structure which transfers the weight of the load to the chassis in such a manner that it will be distributed to both the wheels 11 and 12, thereby providing the wheels 11 with sufficient weight for driving traction with truck supporting surfaces.

To swing the load member, together with the load, from the full line position to the position shown in dotted lines, on Fig. 1, I prefer to provide a rigid oscillatable and reciprocable member which is arranged to act under tension to draw the load-engaging member into the dotted line position and act under the compression to push the load-engaging member to the full line position. Such a mechanism for causing the tilting of the load-engaging member is shown and described in the patent of Edward J. Abbe, No. 1,753,731, issued April 13th, 1930, to my assignee.

The essential parts of such operating mechanism comprises a motor 50, which, through the medium of a speed reduction unit 51, drives a spur gear 52. A suitable driving chain 53 interconnects the sprocket 52 with a sprocket 54 drivingly connected to a shaft 55 mounted in suitable bearings carried by the frame 10, and transmits the power to a gear or pinion 60 which is drivingly connected to such shaft. The pinion 60 meshes with teeth formed on the under side of a rigid rack bar 61, one end of which is pivotally connected to the pivot shaft 31 of the load supporting platform, heretofore mentioned.

For holding the rack in engagement with the pinion, while at the same time allowing the rack to swing about the pinion axis, I have shown a yoke member 62 having bearing portions 63 swingably embracing the shaft 55 at either side of the pinion 60 and the rack bar. The yoke 62 is preferably provided with anti-friction means, such as rollers 64, which engage the upper side of the rack bar 61 and maintain the rack in engagement with the pinion.

To prevent damage to the link mechanism, I prefer to provide each link 30 with a shock absorbing unit 70. Each unit 70 comprises, as shown in Fig. 1, a plunger 71, which is slidably mounted in a boss 72, formed integrally with the respective arm 30, and normally urged toward the corresponding link 40, by a suitable compression spring 75. Consequent upon the approach of a link 40 to the dotted line position, shown in Fig. 1, such link engages the plunger and due to the compression of the spring 75, prevents an abrupt stopping of the movement of the parts.

It will be noted that the double link arrangement, when in dotted line position, is similar in certain respects to a toggle mechanism. The spring 75 prevents the locking effect of a toggle action and due to its action against the link 40, causes such link to swing in a counter-clockwise direction, consequent upon the reversal of the direction of the motor 50, thereby insuring the proper return of the member 18 and the load to the full line position shown in the drawings. The springs 75 act constantly on the links 40 whenever the load is in its raised position, and hence eliminates any undue movement or vibration of the load-engaging member that might be occasioned by undue looseness or wear at the various pivot points.

The load-engaging member 20 is arranged to normally incline downwardly, to insure the contact with a load at its junction with the supporting surface of the truck. To this end, I prefer to support the load-engaging member, when in the full line position, shown in Fig. 1, on the pivots 31, 32, 41 and 42, using the rack bar to prevent undesired downward movement only by the action of the rack bar 61. Any suitable safety mechanism, such as limit switches interposed in the motor control circuit, may be used to prevent excessive swinging movement of the load-engaging member. Such mechanisms being well known in the art, they are not illustrated in detail.

I claim:

1. In an industrial truck, a wheel supported frame, an L-shaped load engaging member disposed in front of said frame and having one leg thereof extending forwardly from the frame adjacent to and substantially parallel with the ground and the other leg extending substantially vertically therefrom adjacent the truck frame, means including a pivoted link connection between said member and the truck frame to swing said member into substantially a V position with the vertex of the V disposed above the truck frame and rearwardly of the load receiving position.

2. In an industrial truck, a wheel supported frame, an L-shaped load supporting member disposed forwardly of said frame, means pivotally connecting said load supporting member to the truck including a pair of non-parallel links, each of said links being pivotally connected at one end with the load supporting member and pivotally connected at the other end with the truck.

3. In an industrial truck, a frame, wheels to support said frame, a load supporting member located forwardly of said frame and having a forwardly extending load engaging member normally laying in a plane below said frame and adapted to be projected beneath a load, a pair of link members pivotally connected to the load supporting member at spaced vertical pivots, a pivotal connection between said links and the chassis, and power operable means to swing the links about their pivotal connection with the chassis, and resilient means disposed between the two links and active when the links are swung about the pivot to return one of said links to normal position consequent upon the operation of power means to return the other link to its normal position.

4. In an industrial truck, a frame, wheels to support said frame, an L shaped load supporting member disposed forwardly of said frame and having one leg adapted to project beneath a load adjacent the truck supporting surface consequent upon movement of the truck toward the load, pivotal means to interconnect said load supporting member with said truck including a pair of link members, one of said links being longer than the other, both of said links having a pivotal connection at one end with the truck and at the other end with the load supporting member.

5. In an industrial truck, a frame, wheels to support said frame, an L shaped load supporting member disposed forwardly of said frame and having one leg adapted to project beneath a load adjacent the truck supporting surface consequent upon movement of the truck toward the load, means to interconnect said load supporting member with said truck including a pair of rigid link members, each of said links having an individual pivotal connection at one end with the truck and an individual connection at the other end with the load supporting member, and means to rock said links about their pivotal connection with the chassis, and swing the pivotal connection between the links and load-supporting member from one side of their pivotal connection with the truck to the other side of such pivotal connection, whereby the weight of the load acts to retain the links in either of their extreme positions.

6. In an industrial truck of the type having a frame-work including a low-slung wheel supported front frame portion and an L-shaped load engaging member, the foot of which in load receiving position is disposed substantially parallel to the ground and close thereto and the leg portion of which stands upright forwardly of the front wheel axes, the combination of guiding means connecting the load engaging member with the main frame-work of the truck and co-operating tilting means acting thereon to simultaneously lift the member bodily and swing the same to rearwardly tilted load-carrying position above the axes of said wheels and materially rearwardly of the load-receiving position.

7. In an industrial truck, front and rear wheels to support said frame, load-engaging member disposed in front of said frame and having one leg thereof extending forwardly from the frame adjacent to and substantially parallel with the ground and the other leg extending substantially vertically therefrom adjacent the truck frame, means including a pair of non-parallel links connecting said member with the truck frame to swing said member into substantially a V position with the vertex of the V disposed above the truck frame, and wherein said links are each pivoted to the frame between the axes of the front and rear wheels.

CLYDE E. COCHRAN.